(12) United States Patent
Santos et al.

(10) Patent No.: US 8,750,526 B1
(45) Date of Patent: Jun. 10, 2014

(54) DYNAMIC BANDWIDTH CHANGE DETECTION FOR CONFIGURING AUDIO PROCESSOR

(71) Applicants: Peter Santos, Los Altos, CA (US);
Carlo Murgia, Sunnyvale, CA (US);
Matthew Cowan, San Jose, CA (US);
Ye Jiang, Sunnyvale, CA (US)

(72) Inventors: Peter Santos, Los Altos, CA (US);
Carlo Murgia, Sunnyvale, CA (US);
Matthew Cowan, San Jose, CA (US);
Ye Jiang, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/734,208

(22) Filed: Jan. 4, 2013

Related U.S. Application Data

(60) Provisional application No. 61/583,151, filed on Jan. 4, 2012.

(51) Int. Cl.
*H04R 29/00* (2006.01)
*H04B 15/00* (2006.01)

(52) U.S. Cl.
USPC ............ 381/56; 381/94.2; 381/94.3; 700/94; 341/61

(58) Field of Classification Search
CPC .......... H04R 29/00; H04R 3/005; H04S 7/40; H03G 9/005; H03H 17/0427; H03H 17/0635; G05B 15/02; G05B 21/02; G06F 3/16; G06F 17/00
USPC ........ 381/56, 58, 81, 123, 94.1–94.8; 700/94, 700/73; 341/61
See application file for complete search history.

(56) References Cited

U.S. PATENT DOCUMENTS

| 5,115,404 | A  | * | 5/1992 | Lo et al. ........................ 345/443 |
| 6,084,916 | A  | * | 7/2000 | Ott ................................ 375/259 |
| 7,562,140 | B2 | * | 7/2009 | Clemm et al. ................. 709/224 |
| 7,791,508 | B2 | * | 9/2010 | Wegener ......................... 341/61 |
| 8,369,973 | B2 | * | 2/2013 | Risbo ............................. 700/94 |
| 8,467,891 | B2 | * | 6/2013 | Huang et al. .................... 700/94 |

* cited by examiner

*Primary Examiner* — Xu Mei
(74) *Attorney, Agent, or Firm* — Carr & Ferrell LLP (57) ABSTRACT

Provided are systems and methods for dynamic detection of changes in signal bandwidth associated with audio samples received by a communication device during handovers, where the communication device is moved through geographical areas served by different wireless network technologies. Based on the detection, operation parameters of an audio processor of the communication device may be adjusted or switched to achieve optimal performance of audio enhancing procedures (e.g., noise suppression) performed by the audio processor and to preserve minimal power consumption.

21 Claims, 5 Drawing Sheets

DYNAMIC BANDWIDTH CHANGE DETECTION FOR CONFIGURING AUDIO PROCESSOR

CROSS REFERENCE TO RELATED APPLICATIONS

This application claims the benefit of U.S. Provisional Application No. 61/583,151, filed Jan. 4, 2012, which is herein incorporated by reference in its entirety.

BACKGROUND

1. Field

The present disclosure relates generally to audio processing, and more particularly to determining signal bandwidth.

2. Description of Related Art

Various electronic devices that can capture and store video and audio signals often use acoustic noise reduction techniques to provide a higher quality of acoustic signals. Noise reduction may improve audio quality in electronic devices, such as mobile telephones, for example, which can convert analog audio into digital audio data streams for transmission over communication networks. Typically, communication devices utilize dedicated audio processors or audio processing circuits configured to perform noise reduction techniques or other audio enhancement procedures.

With conventional wireless communications technologies, a user of a communication device can move through geographical areas covered by different wireless network technologies without any interruptions to the service. Most networks support narrowband (NB) and wideband (WB) voice technologies. As a result, while traveling through various geographical areas, the communication device may receive signals associated with different voice technologies, which may include audio signals having NB (e.g., 300-3400 Hz) or WB (e.g., 50-7000 Hz) spectrum, depending on a specific communication network and its parameters. Such bandwidth changes during a call may negatively affect operations of an audio processor and as a result, the quality and fidelity of audio processing may decrease.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The systems and methods of the present disclosure may provide dynamic detection of changes in bandwidth data associated with audio samples received by a communication device during handovers, when the communication device is moved through geographical areas supported by different wireless network technologies. Based on this detection, operation parameters of an audio processor of the communication device may be adjusted or switched to achieve optimal performance of audio enhancing procedures (e.g., noise suppression) performed by the audio processor as well as to reduce power consumption.

According to one or more embodiments of the present technology, provided is a method for pre-processing audio samples received from a receiving link of the communication device before the audio samples are processed by the audio processor to enhance their fidelity. The pre-processing of audio samples may include measuring at least of the sample rate frequency values and signal bandwidth of the audio samples and calculation of a sample rate change (SRC) value based thereupon. The SRC value may then be compared to a predetermined threshold and in case of the SRC value above the predetermined threshold, the current operation mode of the noise suppressor can be changed to adapt audio samples processing parameters for optimal performance.

According to one or more embodiments of the present technology, provided is another method for pre-processing audio samples received from the receiving link of the communication device before the audio samples are processed by the audio processor to enhance their fidelity. According to these embodiments, a sample rate conversion procedure can be performed with respect to the received audio samples so that all of them have the same sample rate frequency (e.g., 16 kHz). Furthermore, a signal bandwidth analysis (SBA) may be performed with respect to the audio samples to determine any changes in signal bandwidth, e.g., from a WB to NB, or vice versa. The SBA may include splitting the audio samples into lower and upper spectrums and estimating their corresponding energy levels. Furthermore, it may be determined whether a ratio of the energy levels of lower energy spectrum and higher energy spectrum are above a predetermined value, whether the energy level of the lower energy spectrum is above a predetermined value, and whether these two conditions are satisfied for a certain period of time. Accordingly, the SBA may establish whether a signal bandwidth is changed. If the signal bandwidth is changed, the audio processor can be reconfigured, i.e., the audio processor is instructed to change its operating mode to the one corresponding to the detected signal bandwidth.

These and other embodiments are described further below with references to the figures.

DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive or computer-readable medium. It should be noted that methods disclosed herein can be implemented by a computer, e.g., a desktop computer, tablet computer, laptop computer, and so forth.

The present technology may provide audio pre-processing and processing of acoustic signals as received by a communication device, such as a wireless telephone, cellular telephone, mobile telephone, smart phone, etc. from either a microphone or a downlink of a communication network. The audio pre-processing may be performed by a pre-processor to determine current bandwidth characteristics of audio signal to configure an audio processor, which performs audio processing procedures. The audio processing may include noise reduction procedures, noise cancellation procedures, and noise suppression procedures.

Noise reduction may be implemented by subtractive noise cancellation or multiplicative noise suppression. Noise cancellation may be based on null processing, which involves cancelling an undesired component of an acoustic signal by attenuating audio from a specific direction while preserving a desired component of the acoustic signal from a target source such, for example, as a main speaker. Noise suppression may use gain masks multiplied against a sub-band acoustic signal to suppress the energy levels of (the undesired) noise components in the sub-band signals. Both types of noise reduction systems may benefit from implementing the present technology.

According to one or more embodiments of the present disclosure, the pre-processing of the audio signal may include sampling the audio signal by or with the help of an application processor of the communication device. For every audio sample, a pre-processor or some other circuit of the communication device may measure their sample rate values on a regular basis. The sample rate values may then be used to calculate a SRC value, which may be compared to a configurable or predetermined value in real time. If it is determined that the SRC value is increased or decreased and is above or below (correspondingly) the predetermined values during a certain time period, which means there is a change in the sample rate frequency (e.g., a drop from 16 kHz to 8 kHz, or vice versa), the pre-processor may generate corresponding instructions for the audio processor to switch operating mode or adjust operating parameters such as coefficients used by a noise suppression procedure. Thus, the audio processor may be dynamically controlled to adjust parameters of audio enhancement procedures to achieve the optimal fidelity and low power consumption. In additional embodiments, sample rate conversion may also be performed for the audio samples by an asynchronous sample rate converter to meet particular audio processing requirements of the audio processor.

According to one or more further embodiments of the present disclosure, the pre-processing may include performing signal bandwidth analysis (SBA) procedure on the audio samples. The SBA procedure may be performed for those audio signals that keep the sample frequency unchanged while the signal bandwidth changes. In this case, the SBA procedure may commence with performing sample rate conversion of the audio samples by the asynchronous sample rate converter(s). For example, all audio samples may be set to about 16 kHz sample rate frequency. Further, the SBA procedure may perform splitting every audio sample into a first audio signal by applying low pass filtering and a second audio signal by applying high pass filtering. Thus, the first audio signal may be characterized by a lower-energy spectrum and the second audio signal may be characterized by a higher-energy spectrum. For the lower-energy spectrum, a first energy level $E_{lo}$ may be calculated, and similarly for the higher-energy spectrum, a second energy level $E_{hi}$ may be calculated by the pre-processor. The first energy level $E_{lo}$ may be compared to a predetermined reference energy level (e.g., −50 dB). If the first energy level is not above the predetermined reference energy level, no signal bandwidth change is detected. Otherwise, the pre-processor may calculate a ratio of the first energy level to the second energy level, i.e., $E_{lo}/E_{hi}$, or vice versa. The ratio $E_{lo}/E_{hi}$ may then be compared to a predetermined reference ratio value (e.g., 50 dB). The pre-processor may determine whether the condition is met, and if so, for how long. If it is determined that this condition is satisfied during the predetermined time period (e.g., 200 ms), the signal bandwidth is considered to be NB. Otherwise, the signal bandwidth is considered to be WB. This current signal bandwidth information may then be compared to a state variable where previous signal bandwidth information is saved. If they are different, then a signal bandwidth change may be detected. If the signal bandwidth change is associated with a change from WB from NB, half-band filtering and consequent down-sampling may be required before performing noise suppression techniques. Lastly, the signal bandwidth information may be saved to the state variable. In some embodiments, the conditions may be evaluated at a predetermined interval and/or hysteresis added to minimize excessive switching back and forth between NB and WB.

Figure 1:
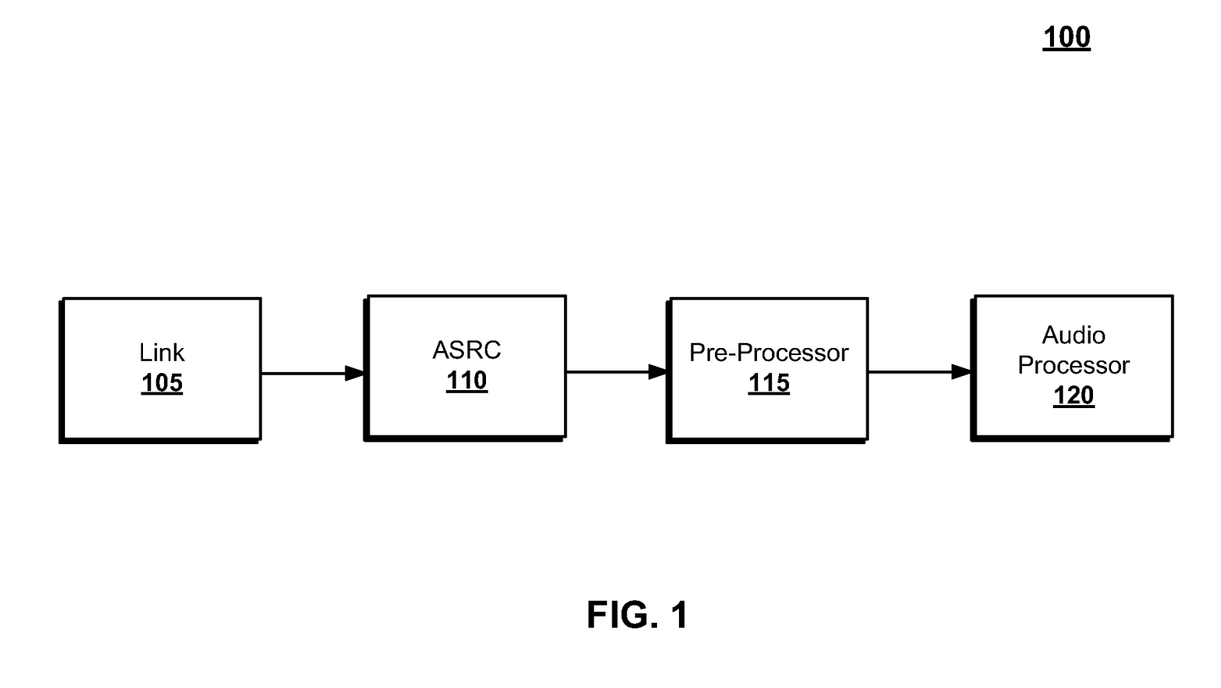
FIG. 1 illustrates a high-level block diagram of a system environment in which embodiments of the present technology may be practiced.

FIG. 1 illustrates a high-level block diagram of a system environment 100 in which embodiments of the present technology may be practiced. The system environment 100 may include one or more links 105, one or more asynchronous sample rate converters (ASRC) 110, a pre-processor or pre-processing circuit 115, and an audio processor 120. The system environment 100 may be part of a communication device, wireless telephone, a computing device, a gaming console, a multimedia device, a video camera, or any similar electronic device capable to capture and process acoustic and other signals.

The links 105 may include one or more microphones configured to capture audio signals or audio samples (e.g., there might be a primary microphone and a separate secondary microphone). The links 105 may also include one or more elements of a down-link path, e.g., it may be an output of a speech codec unit providing digital audio signals from wireless network communications. The audio signal itself may include a speech and noise such as any undesired sounds, reverberations, and echoes.

Some embodiments may utilize level differences (e.g., energy differences) between the acoustic signals received via two or more microphones. Because one of the microphones may be closer to a sound source than the other microphone, the intensity level may be higher for the first microphone, resulting in a larger energy level received by the first microphone, when the main speech is active, for example. The inter-level difference (ILD) may be used to distinguish between speech and noise. An audio processing system may use a combination of energy level differences and time delays to identify speech components. The audio processing system may additionally use phase differences between the signals coming from different microphones to distinguish noise from speech, or distinguish one noise source from another noise source. Based on analysis of such inter-microphone differences, which can be referred to as binaural cues, speech signal extraction or speech enhancement may be performed.

The ASRC 110 may be an optional unit of the system environment 100. The ASRC 110 may be used to perform audio sample rate conversion procedures (e.g., perform conversion from 8 kHz frequency signal into 16 kHz frequency signal).

The pre-processor 115 may be configured to monitor characteristics of the audio samples as derived from the one or more links 105 and configure the audio processor 120 based thereupon. Specifically, the pre-processor 115 may determine whether there is a change in a sample frequency rate for a series of audio samples (i.e., a sample rate change (SRC) value is determined) and if so, adjust operation parameters of the audio processor 120. The pre-processor 115 may also determine whether a signal bandwidth is changed for a series of audio samples (it may be applicable when the sample frequency rate is not changed), and if so, operation parameters of the audio processor 120 may be adjusted to produce a signal with an improved audio quality for transmission across a communications network and/or routing to an output device such as speakers.

The audio processor 120 may perform audio enhancing procedures such as noise suppression, noise cancellation, improving a signal-to-noise ratio (SNR), and so forth. Noise suppression can use gain masks multiplied against a sub-band acoustic signal to suppress the energy levels of noise (i.e., undesired) components in the subband signals. This process may also be referred to as multiplicative noise suppression. In some embodiments, acoustic signals can be modified by other techniques, for example, with a filter. The energy level of a noise component may be reduced to less than a residual noise target level, which may be fixed or vary slowly over time. A residual noise target level may, for example, be defined as a level at which the noise component ceases to be audible or perceptible, below a noise level of a microphone used to capture the acoustic signal, or below a noise gate of a component such as an internal Automatic Gain Control (AGC) noise gate or baseband noise gate within a system used to perform the noise cancellation techniques.

Some examples for noise suppression and audio enhancing techniques performed by audio processor are described in U.S. Utility patent application Ser. No. 12/215,980, entitled "System and Method for Providing Noise Suppression Utilizing Null Processing Noise Subtraction," filed Jun. 30, 2008, and in U.S. Utility patent application Ser. No. 11/699,732, entitled "System and Method for Utilizing Omni-Directional Microphones for Speech Enhancement," filed Jan. 29, 2007, which are incorporated herein by reference in their entireties.

Some or all of the above-described modules in FIG. 1 may include instructions that are stored on a non-transitory storage medium. The instructions can be retrieved and executed by the audio processor or by a general-purpose processor. Some examples of instructions include software, program code, and firmware. Some examples of storage media comprise memory devices and integrated circuits. The instructions are operational when executed by the processor to direct the processor to operate in accordance with embodiments of the present disclosure. Those skilled in the art are familiar with instructions, processor(s), and (computer-readable) storage media.

Figure 2:
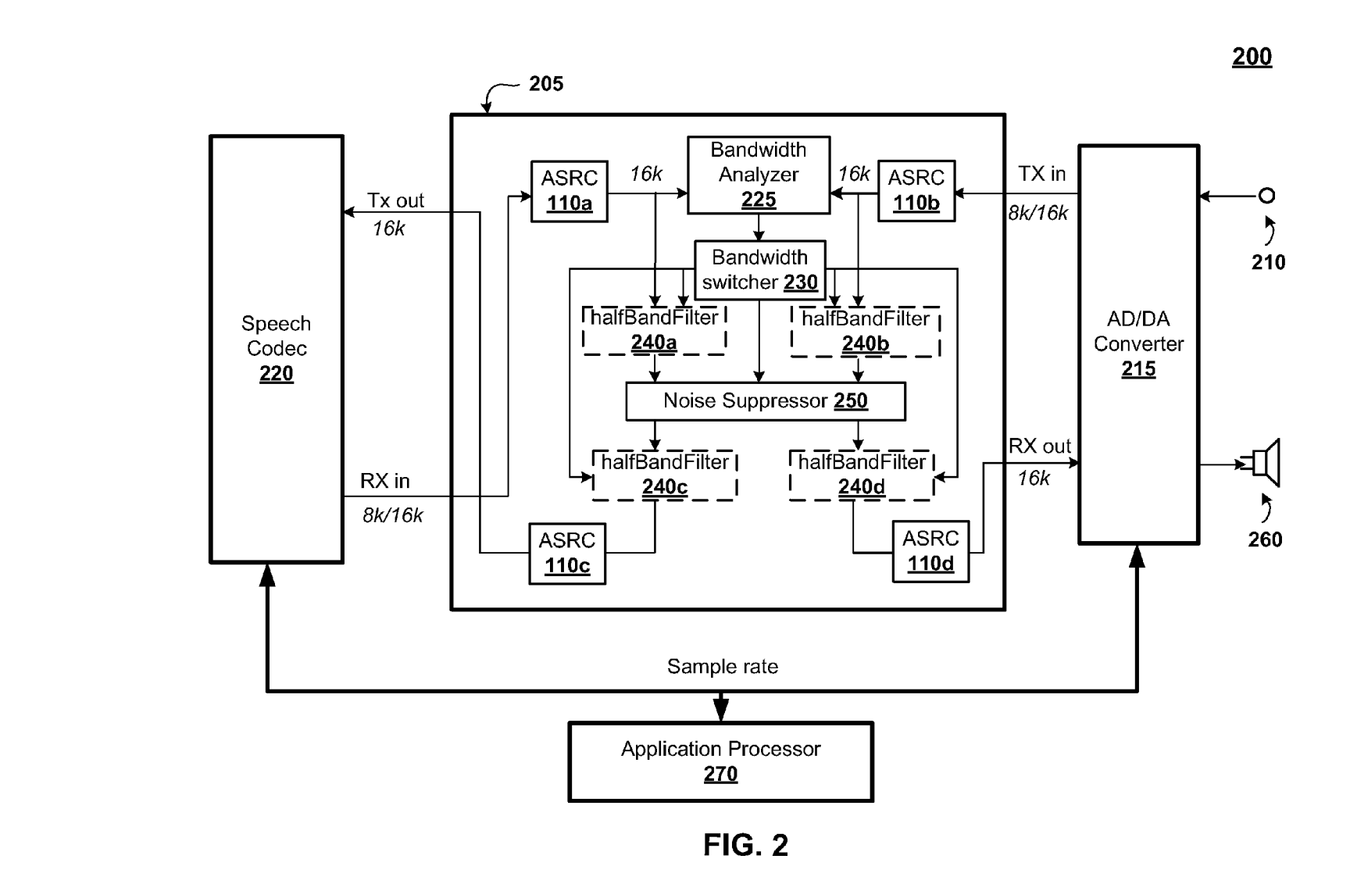
FIG. 2 illustrates a block diagram of a system environment in which embodiments of the present technology may be practiced.

FIG. 2 illustrates a block diagram of a system environment 200 in which embodiments of the present technology may be practiced. Specifically, the system environment 200 represents an example embodiment of the system described above with reference to FIG. 1. It should be also clear that the system environment 200 may be part of a communication device such as a mobile phone.

As shown in the figure, the system environment 200 may include an audio processor 205, one or more microphones 210, analog-to-digital and digital-to-analog (AD/DA) converter 215, speaker 260, speech codec 220, and application processor 270. The application processor 270 may provide a self-contained operating environment that delivers all system capabilities needed to support communication device applications, including memory management, graphics processing and audio processing. In certain embodiments, the application processor 270 may control sampling of audio signal from the AD/DA converter 215 and/or the speech codec 220.

The speech codec 220 may be an operative part of a downlink communication path configured to receive communications from a wireless network and derive or output audio signals encoded in the received communications. The description of speech codec 220 is omitted as not to unnecessarily obscure principles of the present technology, however for those skilled in the art, possible operations of this module should be clear.

The audio processor 205 may include a plurality of elements configured to perform pre-processing of audio samples such as sample rate conversions, detection of signal bandwidth changes, and sample frequency rate changes. The audio processor 205 may also include a noise suppressor 250 configured to perform audio enhancing procedures to improve its quality and fidelity as described above. The elements configured to perform pre-processing may also be capable of switching operation modes of the noise suppressor 250 and/or adjusting its operation parameters.

Further referring to FIG. 2, the audio processor 205 may receive audio sample from the speech codec 220 and/or AD/DA converter 215. The received audio samples may optionally be processed by the ASRC 110a, 110b by changing their sample rate frequencies (if required). The ASRC 110a, 110b may then feed the audio samples to a bandwidth analyzer 225. The bandwidth analyzer 225 may be implemented as a controller or a processor and may be configured to calculate a SRC value and analyze it with respect to a predetermined value, and/or perform SBA procedure as described herein. In other words, the bandwidth analyzer 225 may determine whether there is a change in sample rate for a series of audio samples and/or whether the signal bandwidth changes for a series of audio samples. Based on these determinations, a bandwidth switcher 230 may control the noise suppressor 250 by switching its operating modes or by switching its operational parameters such as coefficients in the process of noise suppression. The output signals of the noise suppressor 250, i.e., improved audio signals, may be then fed to the speech codec 220 for further transmission uplink and/or to the AD/DA converter 215 for further playing via the speaker 260. These output signals may also be fed via ASRC 110c, 110d for down-sampling or up-sampling (e.g., as needed by the design of communication device).

In embodiments, the bandwidth analyzer 225 may also determine that the sample rate frequency value is kept constant for the series of audio samples. In this case, the SBA procedure may be performed for the series of audio samples received from one link (either AD/DA converter 215 or the speech codec 220). If the series of audio samples is not constant, the SBA can be performed for the series of audio samples received from both links (AD/DA converter 215 and the speech codec 220).

In further embodiments, the audio processor 205 may also include optional half-band filters 240 for half-band filtering of the audio signals before and/or after processing of audio signals by the noise suppressor 250.

In certain additional embodiments, the audio processor 205 may be implemented as a single processor (e.g., as a single audio processor) or it may include two or more processors. In certain embodiments, the audio processor 205 may include fewer or additional components, as will be appreciated by those skilled in the art.

Figure 3:
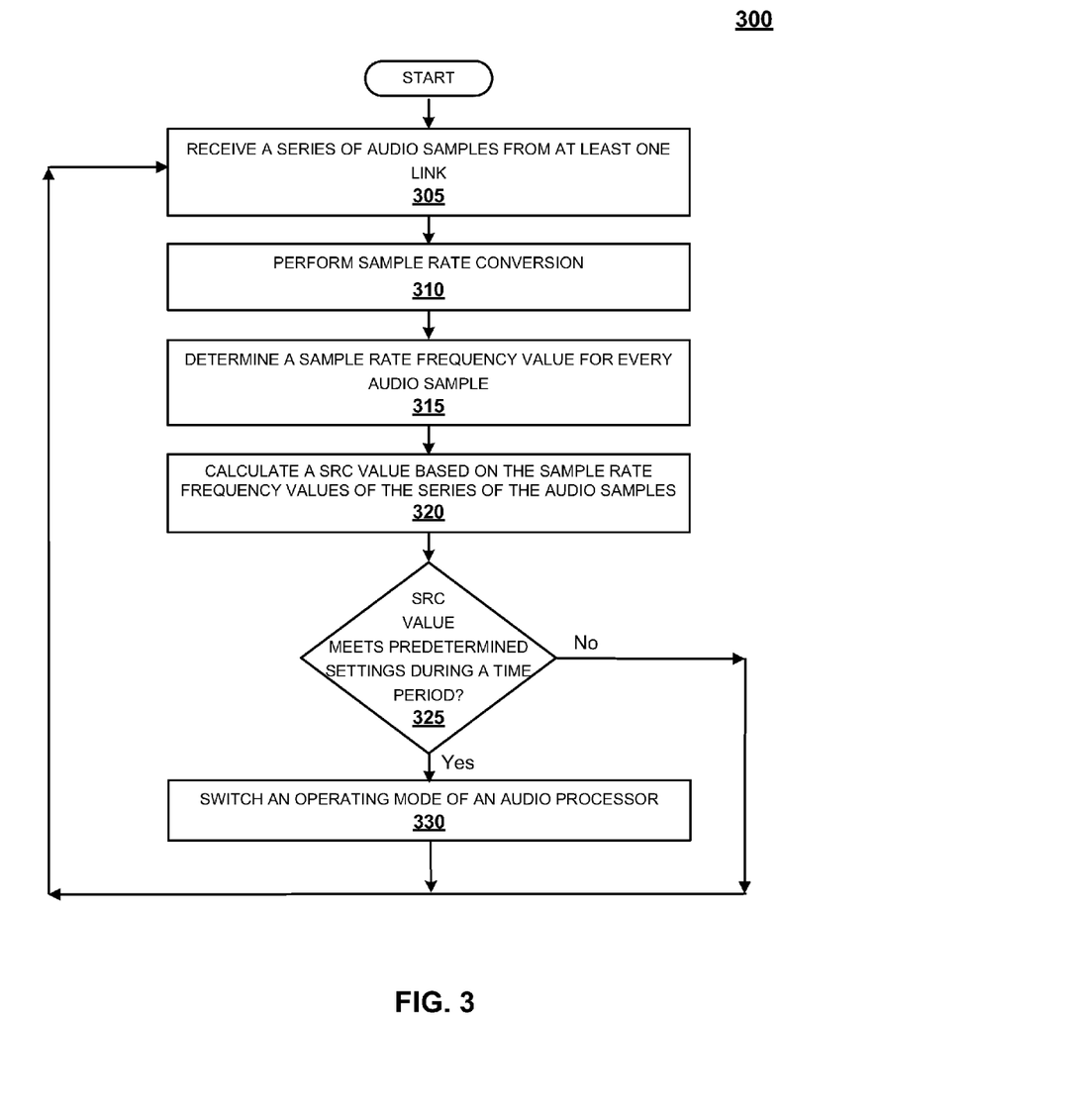
FIG. 3 illustrates a flow chart of an example method for audio processing.

FIG. 3 illustrates a flow chart of an example method 300 for audio processing. The method 300 may be practiced by the system environments 100, 200 and their components as described above with reference to FIGS. 1 and 2.

The method 300 may commence in operation 305 with the audio processor 205 receiving a series of audio samples from the AD/DA converter 215 and/or the speech codec 220. In optional operation 310, the ASRC 110a, 110b may perform sample rate conversion procedure (e.g., convert 8 kHz signal into 16 kHz signal). Furthermore, in operation 315, the bandwidth analyzer 225 may determine a sample rate frequency values for the series of audio samples. In operation 320, the bandwidth analyzer 225 may calculate a SRC value based on the measurements performed in operation 315. In operation 325, the SRC value may be compared by the bandwidth analyzer 225 to a predetermined (and optionally configurable) reference number. If it is determined that the SRC value is above the reference number for at least a certain time period (e.g., 200 ms), the bandwidth switcher 230 switches, in operation 330, a current operation mode of the noise suppressor 250 to the mode which corresponds (i.e., have dedicated operating parameters) to a new sample rate frequency of the series of audio samples as may be defined by the SRC value. Alternatively, if it is determined in operation 325 that the SRC value is below the reference number for at least a time of period, the method 300 may, for example, begin again at the start or terminate.

Figure 4:
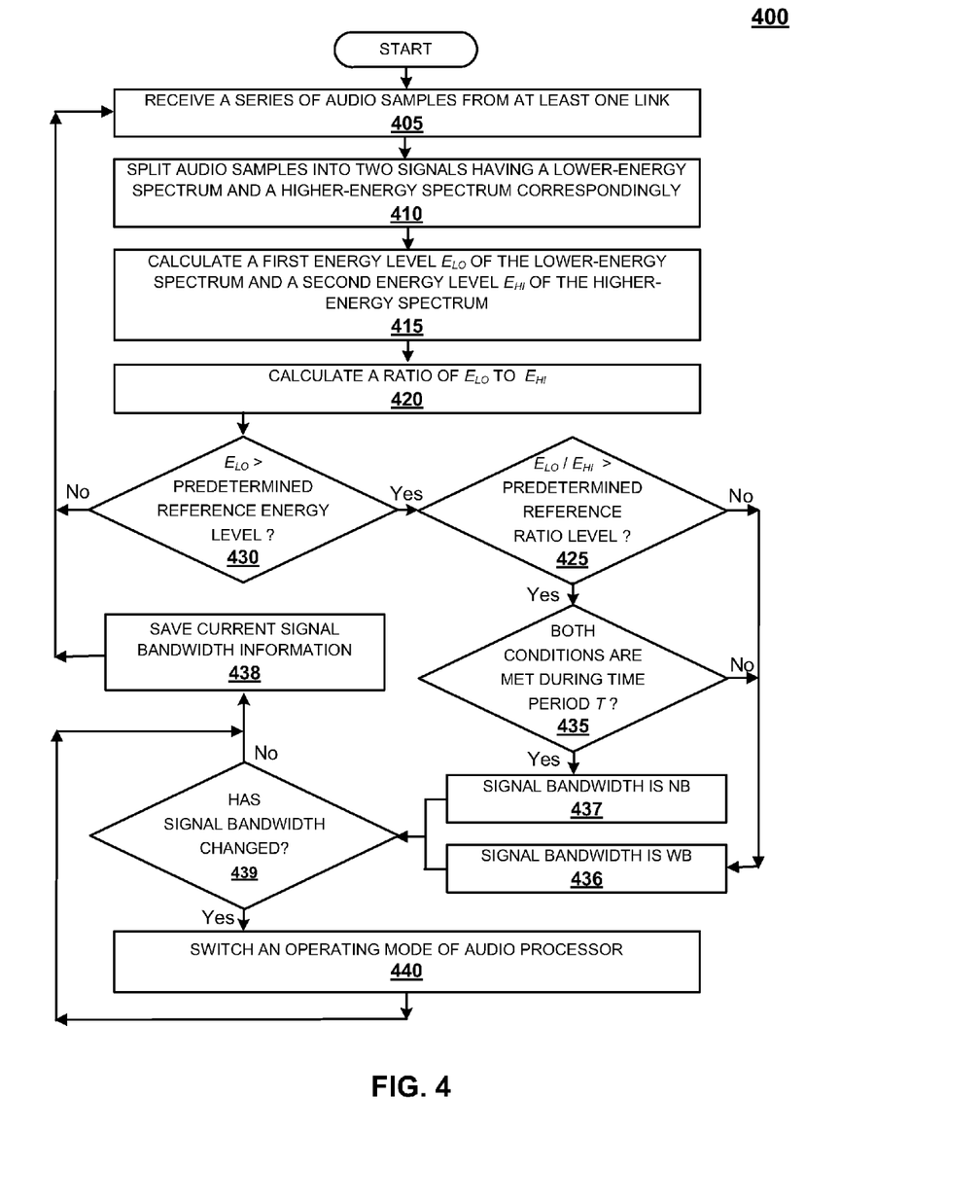
FIG. 4 illustrates a flow chart of another example method for audio processing.

FIG. 4 illustrates a flow chart of another example method 400 for audio processing. The method 400 may be practiced by the system environments 100, 200 and their components as described above with references to FIGS. 1 and 2.

The method 400 may commence in operation 405 with the audio processor 205 receiving a series of audio samples from the AD/DA converter 215 and/or the speech codec 220. In operation 410, bandwidth analyzer 225 may split received audio samples into two singles having a lower-energy spectrum and a higher-energy spectrum. Furthermore, in operation 415, the bandwidth analyzer 225 may calculate or estimate energy levels (e.g., average energy levels) of the lower-energy spectrum and a higher-energy spectrum. In other words, the bandwidth analyzer 225 may calculate $E_{lo}$ and $E_{hi}$ values as discussed above. In operation 420, the bandwidth analyzer 225 may calculate or estimate a ratio of $E_{lo}/E_{hi}$ (optionally, it may be a $E_{hi}/E_{lo}$ ratio).

The method 400 may proceed to a decision block 430, where the bandwidth analyzer 225 may determine whether the energy level a is above of a predetermined reference energy level (e.g., −50 dB). If not, no signal bandwidth change is detected and the method returns to operation 405. If so (i.e., if the energy level a is above of a predetermined reference energy level (e.g., −50 dB)), in operation 425, the bandwidth analyzer 225 may determine whether the ratio of a/Eh, is above of a predetermined reference ratio value (e.g., 50 dB). If so, in operation 435, the bandwidth analyzer 225 may determine whether the conditions of operations 425 and 430 are met during a predetermined time period T (e.g., 300 ms). If all conditions of operations 425-435 are met, the signal bandwidth is considered to be NB at operation 437. Otherwise, at operation 436, the signal bandwidth is considered to be WB. In operation 439, this current signal bandwidth information may then be compared to a state variable where previous signal bandwidth information is saved. If they are different, then a signal bandwidth change may be detected in operation 439. If the signal bandwidth change is associated with a change from WB from NB, half-band filtering and consequent down-sampling may be required before performing noise suppression techniques. If no signal bandwidth change is detected in operation 439, then the method 400 may proceed to operation 438 wherein current signal bandwidth information is saved. Otherwise, if a signal bandwidth change is detected in operation 439, the method 400 may proceed to operation 440, where the bandwidth switcher 230 may switch an operation mode of the noise suppressor 250 to the mode which corresponds to a new signal bandwidth as may be defined by the above analysis. The method 400 may then proceed from operation 440 to operation 438 wherein current signal bandwidth information is saved. After operation 438, the method 400 may proceed back to operation 405.

Figure 5:
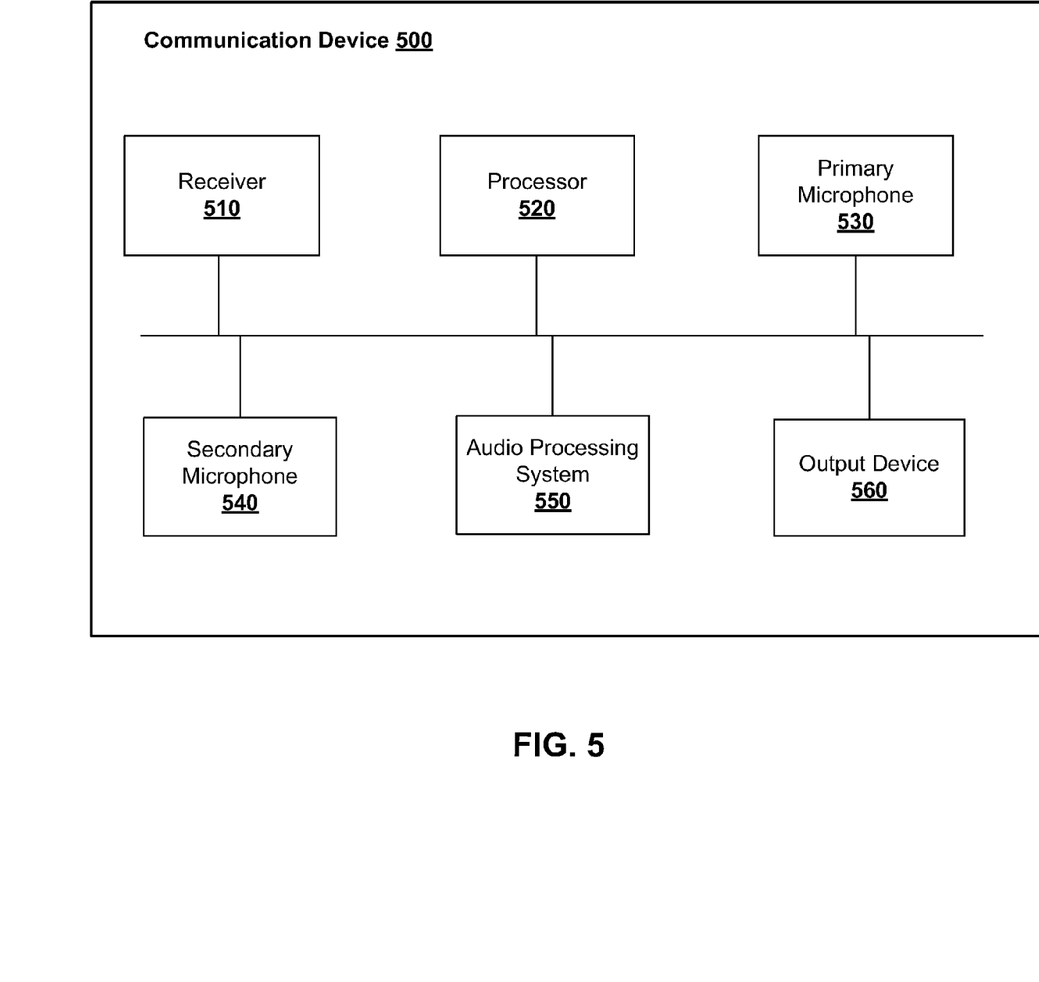
FIG. 5 illustrates a block diagram of a communication device implementing embodiments of the present technology.

FIG. 5 illustrates a block diagram of a communication device 500 implementing embodiments of the present technology. In example embodiments, the communication device 500 is an audio receiving device that comprises a receiver 510, a processor 520, a primary microphone 530, a secondary microphone 540, an audio processing system 550, and an output device 560. The communication device 500 may comprise more or other components necessary for communication device 500 operations. Similarly, the communication device 500 may comprise fewer components that perform similar or equivalent functions to those depicted in FIG. 5.

The processor 520 may include hardware and software which implements the processing unit described above. The processing unit may process floating point operations and other operations for the processor 520.

The example receiver 510 is an acoustic sensor configured to receive a signal from a (communication) network. In some embodiments, the receiver 510 may comprise an antenna device. The signal may then be forwarded to the audio processing system 550 and then to the output device 560. For example, audio processing system 550 may include the present technology. The present technology may be used to mix audio streams in both the transmit and receive paths of a communication device.

The audio processing system 550 may furthermore be configured to receive the acoustic signals from an acoustic source via the primary and secondary microphones 530 and 540 (e.g., primary and secondary acoustic sensors) and process the acoustic signals. The primary and secondary microphones 530 and 540 may be spaced a distance apart in order to allow for an energy level differences between them. After reception by the microphones 530 and 540, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 530 is herein referred to as the primary acoustic signal, while the acoustic signal received by the secondary microphone 540 is herein referred to as the secondary acoustic signal. It should be noted that embodiments of the present invention may be practiced utilizing any plurality of microphones/audio sources. In example embodiments, the acoustic signals from output device 560 may be included as part of the (primary or secondary) acoustic signal. The primary acoustic signal and the secondary acoustic signal may be processed by audio processing system 550 to produce a signal with an improved signal to noise ratio for transmission across a communications network and/or routing to the output device 560. Additional audio source for audio processing system 550 may be generated internally to communication device 500, for example by a user interface (or media interface) that runs on processor 520.

The output device 560 may be any device which provides an audio output to a listener (e.g., an acoustic source). For example, the output device 560 may comprise a speaker, an earpiece of a headset, or handset on the communication device 500.

Embodiments of the present invention may be practiced on any device that is configured to receive and/or provide audio such as, but not limited to, cellular phones, phone handsets, headsets, and systems for teleconferencing applications.

Some or all of the above-described modules can be comprised of instructions that are stored on storage media. The instructions can be retrieved and executed by the processor 520. Some examples of instructions include software, program code, and firmware. Some examples of storage media comprise memory devices and integrated circuits. The instructions are operational when executed by the processor 520 to direct the processor 520 to operate in accordance with embodiments of the present invention. Those skilled in the art are familiar with instructions, processor(s), and (computer readable) storage media.

The present technology is described above with reference to example embodiments. It will be apparent to those skilled in the art that various modifications may be made and other embodiments can be used without departing from the broader scope of the present technology. For example, embodiments of the present technology may be applied to any system (e.g., non speech enhancement system) utilizing acoustic echo cancellation (AEC). Therefore, these and other variations upon the example embodiments are intended to be covered by the present invention.

What is claimed is:

1. A method for audio processing, the method comprising:
    receiving, by a pre-processor, a series of audio samples from at least one link;
    measuring, by the pre-processor, a sample rate frequency value for every audio sample;
    calculating, by the pre-processor, a sample rate change (SRC) value based on at least one of the sample rate frequency and signal bandwidth values of the series of the audio samples;
    determining, by the pre-processor, that the SRC value meets a predetermined setting; and
    based on the determination, switching, by the pre-processor, an operating mode of an audio processor configured to perform audio processing of the series of audio samples, the operating mode of the audio processor defining at least one of audio sample processing parameters and coefficients of a noise suppression procedure.

2. The method of claim 1, further comprising performing, by the audio processor, dynamic noise suppression of the series of audio samples.

3. The method of claim 2, wherein the dynamic noise suppression depends on the SRC value.

4. The method of claim 1, further comprising performing sample rate conversion, by an asynchronous sample rate converter, of one or more of the audio samples.

5. The method of claim 1, wherein the at least one link includes a microphone.

6. The method of claim 1, wherein the at least one link includes a communications network downlink.

7. The method of claim 1, wherein the sample rate frequency value is about 8 kHz.

8. The method of claim 1, wherein the sample rate frequency value is about 16 kHz.

9. The method of claim 1, further comprising determining, by the pre-processor, that the SRC value meets the predetermined setting during a predetermined period of time.

10. The method of claim 1, wherein the predetermined setting includes a predetermined reference SRC value.

11. A system for audio processing, the system comprising:
    a pre-processor configured to receive a series of audio samples, monitor a sample rate change (SRC) value of the series of audio samples over a period of time, and detect a change of the SRC value within the period of time for a predetermined amount;
    an audio processor configured to perform audio enhancement procedures for the series of audio samples; and
    wherein the pre-processor is further configured to instruct the audio processor to switch an operating mode based on the detection of the change in the SRC value, the operating mode of the audio processor defining at least one of audio sample processing parameters and coefficients of a noise suppression procedure.

12. A non-transitory computer readable storage medium having embodied thereon a program, the program being executable to perform a method for audio processing, the method comprising:
    receiving, by a pre-processor, a series of audio samples from at least one link;
    measuring, by the pre-processor, a sample rate frequency value for every audio sample;
    calculating, by the pre-processor, a sample rate change (SRC) value based on at least one of the sample rate frequency and signal bandwidth values of the series of the audio samples;
    determining, by the pre-processor, that the SRC value meets a predetermined setting; and
    based on the determination, switching, by the pre-processor, an operating mode of an audio processor configured to perform audio processing of the series of audio samples, the operating mode of the audio processor defining at least one of audio sample processing parameters and coefficients of a noise suppression procedure.

13. The non-transitory computer readable storage medium of claim 12, wherein the method further comprises performing, by the audio processor, dynamic noise suppression of the series of audio samples.

14. The non-transitory computer readable storage medium of claim 13, wherein the dynamic noise suppression depends on the SRC value.

15. The non-transitory computer readable storage medium of claim 12, wherein the method further comprises performing sample rate conversion, by an asynchronous sample rate converter, of one or more of the audio samples.

16. The non-transitory computer readable storage medium of claim 12, wherein the at least one link includes a microphone.

17. The non-transitory computer readable storage medium of claim 12, wherein the at least one link includes a communications network downlink.

18. The non-transitory computer readable storage medium of claim 12, wherein the sample rate frequency value is about 8 kHz.

19. The non-transitory computer readable storage medium of claim 12, wherein the sample rate frequency value is about 16 kHz.

20. The non-transitory computer readable storage medium of claim 12, wherein the method further comprises determining, by the pre-processor, that the SRC value meets the predetermined setting during a predetermined period of time.

21. The non-transitory computer readable storage medium of claim 12, wherein the predetermined setting includes a predetermined reference SRC value.

* * * * *